United States Patent
Jain et al.

(10) Patent No.: US 12,134,361 B2
(45) Date of Patent: Nov. 5, 2024

(54) MOTION EVENT DETECTION

(71) Applicant: STMICROELECTRONICS, INC., Coppell, TX (US)

(72) Inventors: Mahaveer Jain, Milpitas, CA (US); Mahesh Chowdhary, San Jose, CA (US)

(73) Assignee: STMICROELECTRONICS, INC., Coppell, TX (US)

( * ) Notice: Subject to any disclaimer, the term of this patent is extended or adjusted under 35 U.S.C. 154(b) by 262 days.

(21) Appl. No.: 17/717,855

(22) Filed: Apr. 11, 2022

(65) Prior Publication Data

US 2023/0322170 A1   Oct. 12, 2023

(51) Int. Cl.
*B60W 40/10*     (2012.01)
*B60R 16/023*    (2006.01)
*B60R 16/03*     (2006.01)

(52) U.S. Cl.
CPC .......... *B60R 16/0232* (2013.01); *B60R 16/03* (2013.01); *B60W 40/10* (2013.01); *B60W 2400/00* (2013.01); *B60W 2520/00* (2013.01)

(58) Field of Classification Search
CPC .... B60R 16/0232; B60R 16/03; B60W 40/10; B60W 2400/00; B60W 2520/00
See application file for complete search history.

(56) References Cited

U.S. PATENT DOCUMENTS

| | | | |
|---|---|---|---|
| 7,532,108 B2 | 5/2009 | Sugie et al. | |
| 7,886,168 B2 | 2/2011 | Lertora et al. | |
| 10,260,877 B2 | 4/2019 | Chowdhary et al. | |
| 2006/0244576 A1* | 11/2006 | Sugie | B60R 25/1004 340/429 |
| 2008/0120201 A1* | 5/2008 | Velazquez | G01D 9/005 705/28 |
| 2008/0262646 A1* | 10/2008 | Breed | G01F 23/2962 700/226 |
| 2011/0077865 A1 | 3/2011 | Chen et al. | |
| 2015/0276792 A1* | 10/2015 | Sato | G06F 3/038 73/510 |
| 2017/0313269 A1* | 11/2017 | Breed | G01F 23/2962 |
| 2019/0017827 A1* | 1/2019 | Freeman | G01C 21/165 |
| 2020/0272221 A1* | 8/2020 | Foster | H04W 52/0251 |
| 2021/0056315 A1 | 2/2021 | Kale et al. | |
| 2021/0221312 A1* | 7/2021 | Jenkins | G07C 5/008 |
| 2023/0322170 A1* | 10/2023 | Jain | B60W 40/10 701/23 |

* cited by examiner

*Primary Examiner* — Daniel M. Robert
(74) *Attorney, Agent, or Firm* — SEED IP LAW GROUP LLP

(57) ABSTRACT

The present disclosure is directed to a device and method for detection of motion events including towing of the vehicle, jacking of the vehicle, and the vehicle being hit by another object. Processing is split between an MCU and a sensor unit. After the vehicle is turned off and before the MCU enters a sleep mode, the MCU calculates a gravity vector of the vehicle using accelerometer data, calculates threshold values based on the gravity vector, and saves the threshold values. After the MCU enters the sleep mode, the sensor unit subsequently monitors and detects motion events with the saved threshold values.

20 Claims, 4 Drawing Sheets

MOTION EVENT DETECTION

BACKGROUND

Technical Field

The present disclosure is directed to detection of motion events.

Description of the Related Art

It is desirable for automotive vehicles and asset tracking systems to include motion event detection for security purposes. For example, some vehicles include towing detection that detects whether the vehicles is being towed by a tow truck, and impact detection that detects whether the vehicle has hit an object. Motion event detection is particularly important while the vehicle is turned off and parked so that a user away from his or her vehicle may be alerted to the vehicle being stolen or towed, or the vehicle being damaged.

Very few systems integrate motion event detection due its complexity and limitations. Further, current motion event detection solutions are generally implemented on standard microcontrollers that consume significant amounts of power. For example, in many current motion event detection solutions, motion event detection algorithms are executed on the general application processor or telematics control unit that controls various other functions of the vehicle, such as the entertainment and navigation system. Consequently, current motion event detection solutions are not suitable for scenarios in which a vehicle is powered off and in which assets are tracked for extended periods of time on limited battery life. Asset tracking applications struggle with the same constraints of battery life.

In addition, sensors utilized by current motion event detection solutions typically have to be mounted in specific orientations in order to obtain accurate results. For example, current motion event detection solutions for vehicles are generally tailored to process sensor measurements for cases in which the vehicle is on a flat horizontal surface, and not for cases in which the vehicle is on an inclined surface, such as a hill.

BRIEF SUMMARY

The present disclosure is directed to detection of motion events for an automotive vehicle. Motion events include, for example, towing of the vehicle, jacking of the vehicle (e.g., one or more tires of the vehicle being lifted), and the vehicle being hit by another object.

In order to perform the detection while the vehicle is parked and turned off, detection processing is split between (1) a main control unit (MCU), sometimes called a telematics control unit, on board the vehicle; and (2) a sensor unit, which includes multiple sensors (e.g., an accelerometer, gyroscope, etc.) and is capable of executing programs, such as a finite state machine and a classification solution (e.g., a decision tree), on board the vehicle. The sensor unit further allows configuration of certain threshold parameters during runtime. The MCU is a high-powered device that enters a sleep mode after a threshold amount of time (e.g., 30 minutes) of the vehicle being turned off. The sensor unit is a low-powered device that remains on after the vehicle is turned off.

After the vehicle is turned off and before the MCU enters a sleep mode, the MCU calculates a gravity vector of the vehicle using accelerometer data, calculates threshold values based on the gravity vector to adopt solution for different slope, and saves the threshold values for the sensor unit. After the MCU enters the sleep mode, the sensor unit executes, for example, a finite state machine with the saved threshold values to detect motion events.

As the detection is handled by a low-powered sensor unit, detection may be performed while the vehicle is parked and turned off and without draining the vehicle's battery. In addition, the detection is accurate regardless of the orientation of the vehicle (e.g., parked on a flat surface or on a hill) because the MCU calculates the gravity vector and threshold values each time the vehicle is parked.

BRIEF DESCRIPTION OF THE SEVERAL VIEWS OF THE DRAWINGS

In the drawings, identical reference numbers identify similar features or elements. The size and relative positions of features in the drawings are not necessarily drawn to scale.

DETAILED DESCRIPTION

In the following description, certain specific details are set forth in order to provide a thorough understanding of various aspects of the disclosed subject matter. However, the disclosed subject matter may be practiced without these specific details. In some instances, well-known structures and methods of manufacturing electronic components and sensors have not been described in detail to avoid obscuring the descriptions of other aspects of the present disclosure.

Unless the context requires otherwise, throughout the specification and claims that follow, the word "comprise" and variations thereof, such as "comprises" and "comprising," are to be construed in an open, inclusive sense, that is, as "including, but not limited to."

Reference throughout the specification to "one embodiment" or "an embodiment" means that a particular feature, structure, or characteristic described in connection with the embodiment is included in at least one embodiment. Thus, the appearance of the phrases "in one embodiment" or "in an embodiment" in various places throughout the specification are not necessarily all referring to the same aspect. Furthermore, the particular features, structures, or characteristics may be combined in any suitable manner in one or more aspects of the present disclosure.

As discussed above, many current motion event detection solutions implemented on standard microcontrollers, such as the vehicle's general application processor, consume significant amounts of power. Consequently, current motion event detection solutions are not suitable for scenarios in which a vehicle is powered off and in which assets are tracked for extended periods of time on limited battery life. Further, current motion event detection solutions are generally tailored for cases in which the vehicle is on a flat horizontal surface, and cannot accurately detect motion events when the vehicle is on an inclined surface, such as a hill.

The present disclosure is directed to detection of motion events for an automotive vehicle. In order to conserve power, detection processing is split between a micro controller unit (MCU) and a sensor unit of the vehicle. Upon the vehicle being parked, the MCU calculates and saves threshold values and enters a sleep state. The sensor unit subsequently monitors for motion events using the saved threshold values. Since the MCU calculates the threshold values at the time of parking, the detection is accurate regardless of the orientation of the vehicle.

Figure 1:
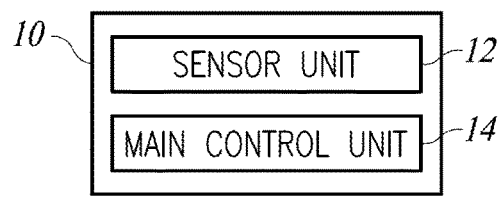
FIG. 1 is a block diagram of a device according to an embodiment disclosed herein.

FIG. 1 is a block diagram of a device 10 according to an embodiment disclosed herein. The device 10 is on board an automotive vehicle, such as a car, truck, and motorcycle. In one embodiment, the device 10 is embedded in the vehicle along with other electronic components of the vehicle (e.g., fabricated on the same printed circuit board as other electronic components of the vehicle). As such, the device 10 may not be easily removed by a thief. As will be discussed in further detail below, an orientation of the device 10 is determined before motion event detection is performed, and, thus, the motion event detection disclosed herein is not constrained by the installation position of the device 10 in the vehicle.

The device 10 is configured to detect motion events, such as towing of the vehicle (e.g., lifting and pulling of the vehicle with another vehicle), jacking of the vehicle (e.g., lifting of one or more tires of the vehicle with some tilt), and the vehicle being hit by another object (e.g., crash or impact on the vehicle). The device 10 includes a sensor unit 12 and a MCU 14.

The sensor unit 12 is a multi-sensor device that includes one or more types of sensors including, but not limited to, an accelerometer and a gyroscope. The accelerometer measures acceleration along one or more axes. The gyroscope measures angular velocity along one or more axes. The sensor unit 12 also includes its own onboard memory and processor. The processor is configured to process data generated by the sensors, and execute simple programs, such as finite state machines and decision tree logic. As will be discussed in further detail below, the sensor unit 12 monitors for motion events and wakes the MCU 14 upon detecting a motion event.

The sensor unit 12 is a power-efficient, low-powered device that remains on after the vehicle and other electronic components of the vehicle, including the MCU 14, are turned off. In one embodiment, the sensor unit 12 consumes between 5 and 10 microamps during processing.

The MCU 14 is a general purpose processing unit. The MCU 14 may be any type of processor, controller, or signal processor configured to process data. In one embodiment, the MCU 14 is the vehicle's own microcontroller, such as the vehicle's telematics control unit (TCU). For example, the MCU 14, along with processing data for motion event detection discussed below, is utilized to collect telemetry data (e.g., location, speed, and engine data) of the vehicle and execute the vehicle's entertainment system and engine control (e.g., timing, fuel delivery, air intake). As will be discussed in further detail below, the MCU 14 determines gravity vectors and threshold values for motion event detection.

The MCU 14 is a high-powered processing unit that enters a sleep mode after a threshold amount of time (e.g., 30 minutes) of the vehicle being turned off. In one embodiment, the MCU 14 consumes between 1 to 3 milliamps during processing.

Figure 2:
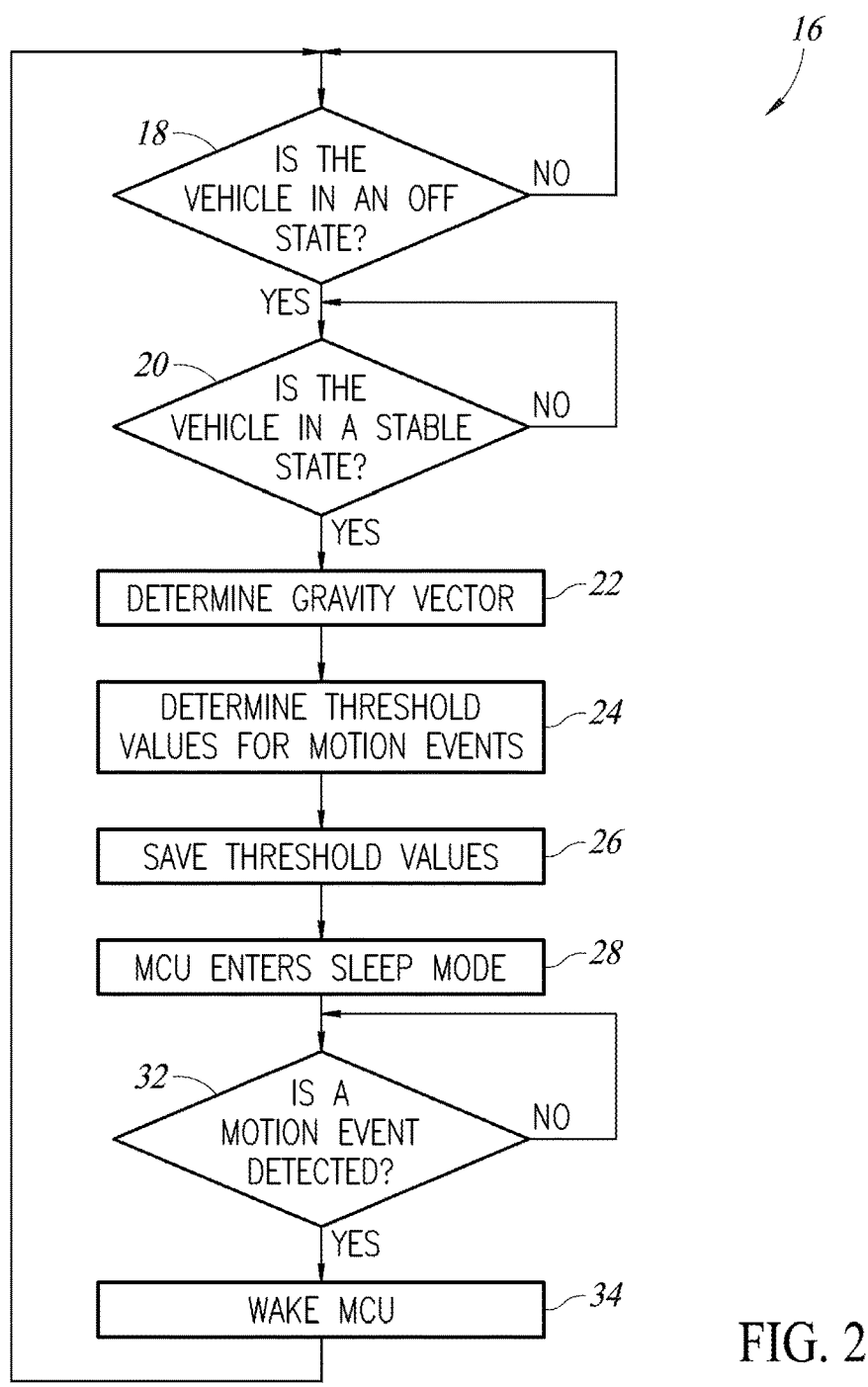
FIG. 2 is a flow diagram of a method for performing motion event detection according to an embodiment disclosed herein.

FIG. 2 is a flow diagram of a method 16 for performing motion event detection according to an embodiment disclosed herein. Motion event detection is performed for the vehicle containing the device 10 of FIG. 1.

The motion event detection detects a towing event, a jacking event, and an impact event. A towing event occurs when the vehicle is towed (e.g., lifted and pulled, or on a flatbed) by another vehicle (e.g., a tow truck). The vehicle is typically lifted to an angle between 6 and 10 degrees during a towing event. A jacking event occurs when one or more tires of the vehicle is lifted with some tilt. The vehicle is typically lifted to an angle between 1 and 2 degrees during a jacking event. Due to the change in angle, an accelerometer reading will change. These changes can then be measured using a finite state machine. An impact event occurs when the vehicle is hit by another object (e.g., bumped or crashed into by another vehicle). The vehicle typically undergoes a sudden and sharp change in movement during an impact event.

In block 18, the MCU 14 determines whether or not the vehicle is in an off state. In one embodiment, the MCU 14 determines the vehicle is in the off state in response to the vehicle's engine being shut off. In one embodiment, the MCU 14 also determines the vehicle is in the off state in response to various electronics of the vehicle being turned off, and the doors of the vehicle being locked.

In a case where the vehicle is not in the off state, the method 16 remains on block 18, where the MCU 14 continues to monitor for the off state.

In a case where the vehicle is in the off state, the method 16 moves to block 20. In block 20, the MCU 14 determines whether or not the vehicle is in a stable state. In the stable state, the vehicle is parked and is motionless for a threshold amount of time (e.g., 5 to 10 minutes). The vehicle is stationary in the stable state.

The MCU 14 determines whether the vehicle is in the stable state based on sensor data generated by the sensor unit 12 (e.g., acceleration and angular velocity measured by the sensor unit 12). In one embodiment, the MCU 14 determines the vehicle is in the stable state in response to a mean of acceleration measurements over a determined amount of time being under a first threshold value, and a variance of the acceleration measurements over the determined amount of time being under a second threshold value. Conversely, the MCU 14 determines the vehicle is not in the stable state in response to the mean of the acceleration measurements over the determined amount of time being equal to or greater than the first threshold value, or a variance of the acceleration measurements over the determined amount of time being equal to or greater than the second threshold value.

In a case where the vehicle is not in the stable state, the method 16 remains on block 20, where the MCU 14 continues to monitor for the stable state.

In a case where the vehicle is in the stable state, the method 16 moves to block 22. It is noted that remaining blocks 22, 24, 26, 28, 30, 32, and 34 are performed while the vehicle is in the off state and the stable state. In block 22, the MCU 14 determines a gravity vector of the vehicle. The gravity vector is used to determine a current orientation of the device 10 and the vehicle. The gravity vector indicates the amount and direction of gravity acting upon the vehicle, more specifically the device 10. Once determined, the gravity vector is saved for later use.

The gravity vector is particularly important because the vehicle and the device 10 may have numerous orientations depending on where the vehicle is parked. For example, the orientation of the device 10 may change depending on whether the vehicle is parked on paved surface, an unpaved surface, an inclined surface, etc. Without knowing the current orientation of the vehicle and the device 10, motion event detection would result in inaccurate results. For example, current motion event detection solutions assume that the vehicle is parked on a level surface, and often incorrectly detect a motion event in a case where the vehicle is positioned on an inclined or declined surface.

The gravity vector is determined based on acceleration measurements generated by the sensor unit 12, more specifically the accelerometer included in the sensor unit 12. As the gravity vector is calculated while the vehicle is in the off state and the stable state, acceleration measured by the accelerometer will be mainly due to gravity.

In a case where the sensor unit 12 includes a 3-axis accelerometer that measures acceleration along an X axis, a Y axis that is transverse to the X axis, and a Z axis that is transverse to the X axis and the Y axis, the MCU 14 calculates the gravity vector $\vec{g}$ using equations (1) and (2) below:

$$\vec{g} = \begin{bmatrix} g_x \\ g_y \\ g_z \end{bmatrix} = \begin{bmatrix} \frac{a_x}{Norm} \\ \frac{a_y}{Norm} \\ \frac{a_z}{Norm} \end{bmatrix} \quad (1)$$

$$Norm = \sqrt{a_x^2 + a_y^2 + a_z^2} \quad (2)$$

where $a_x$, $a_y$, and $a_z$ are acceleration measured by the sensor unit 12 along the X axis, Y axis, and Z axis, respectively; and $g_x$, $g_y$, and $g_z$ are gravity components along the X axis, Y axis, and Z axis, respectively. For example, the gravity vector $\vec{g}$ may be equal to [0.2914, 0.8741, 0.3885].

In one embodiment, in a case where the MCU 14 is unable to accurately determine the gravity vector due to, for example, the vehicle not being absolutely stationary or the sensor unit 12 experiencing external vibration by the engine, the MCU 14 sets a previously calculated gravity vector from a previous execution of the method 16 as the gravity vector $\vec{g}$. In this embodiment, for an initial first execution of the method 16 where there is no previously calculated gravity vector, the MCU 14 utilizes a rotation matrix to determine the gravity vector $\vec{g}$. More specifically, the MCU 14 assumes the vehicle is on a flat, level (i.e., not inclined) surface, and sets an initial gravity vector to [0, 0, 1 g]. The initial gravity vector is then adjusted by the rotation matrix to determine the gravity vector $\vec{g}$. The gravity vector $\vec{g}$ is calculated using equations (3) and (4) below:

$$R = \begin{bmatrix} R11 & R12 & R13 \\ R21 & R22 & R23 \\ R31 & R32 & R33 \end{bmatrix} \quad (3)$$

$$\vec{g} = R * \begin{bmatrix} 0 \\ 0 \\ 1 \end{bmatrix} = \begin{bmatrix} R13 \\ R23 \\ R33 \end{bmatrix} \quad (4)$$

where R11, R12, R13, R21, R22, R23, R31, R32, and R33 are determined rotation values.

The method 16 then moves to block 24. In block 24, the MCU 14 determines threshold values for motion events. The MCU 14 determines at least two different thresholds values for each motion event being detected. Namely, the MCU 14 determines an upper towing threshold value and a lower towing threshold value for the towing event, an upper jacking threshold value and a lower jacking threshold value for the jacking event, and an upper impact threshold value and a lower impact threshold value for the impact event.

The upper towing threshold value is greater than the lower towing threshold value, the upper jacking threshold value is greater than the lower jacking threshold value, and the upper impact threshold value is greater than the lower impact threshold value. In one embodiment, the upper towing threshold, the upper jacking threshold value, and the upper impact threshold value are positive values, and the lower towing threshold value, the lower jacking threshold value, and the lower impact threshold value are negative values. As will be discussed in further detail below, the threshold values are compared to measurements generated by the sensor unit 12 to detect a towing event, a jacking event, and an impact event. The solution of detecting various motion events may be implemented in a machine learning core, a finite state machine, or a combination thereof.

The upper and lower threshold values are determined using the gravity vector determined in block 22. The upper threshold value is calculated as a sum of the gravity vector and an adjustment value, and the lower threshold value is calculated as a difference between the gravity vector and the adjustment value. The adjustment value is tailored to the event being detected. Each of the towing event, jacking event, and impact event may be assigned a respective adjustment value. The adjustment value effectively represents the minimum rotation or impact to be detected.

As an example, if the gravity vector $\vec{g}$ determined in block 22 is equal to [0.2914, 0.8741, 0.3885] and the adjustment value is equal to 0.1, the upper and lower threshold values for each of the X axis, the Y axis, and Z axis is calculated as below:

X Axis Lower Threshold Value=0.2914−0.1=0.1914

X Axis Upper Threshold Value=0.2914+0.1=0.3914

Y Axis Lower Threshold Value=0.8741−0.1=0.7741

Y Axis Upper Threshold Value=0.8741+0.1=0.9741

Z Axis Lower Threshold Value=0.3885−0.1=0.2885

Z Axis Upper Threshold Value=0.3885+0.1=0.4885

For a towing event, the MCU 14 calculates an upper towing threshold value and a lower towing threshold value for each axis of the accelerometer of the sensor unit 12. For example, in a case where the sensor unit 12 includes a 3-axis accelerometer, the MCU 14 calculates first upper and lower towing threshold values that are compared with acceleration along the X axis, second upper and lower towing threshold values that are compared with acceleration along the Y axis, and third upper and lower towing threshold values that are compared with acceleration along the Z axis. Accordingly, in this case, the MCU 14 calculates six total towing threshold values for the towing event. As will be discussed in further detail below, detection of the towing event is independently performed for each axis of the accelerometer of the sensor unit 12. The logic may have additional conditions on signals to improve the performance.

Similarly, for a jacking event, the MCU 14 calculates an upper jacking threshold value and a lower jacking threshold value for each axis of the accelerometer of the sensor unit 12. For example, in a case where the sensor unit 12 includes the 3-axis accelerometer that measures acceleration along the X axis, the Y axis, and the Z axis, the MCU 14 calculates first upper and lower jacking threshold values that are compared with acceleration along the X axis, second upper and lower jacking threshold values that are compared with acceleration along the Y axis, and third upper and lower jacking threshold values that are compared with acceleration along the Z axis. Accordingly, in this case, the MCU 14 calculates six total jacking threshold values for the jacking event. As will be discussed in further detail below, detection of the jacking event is independently performed for each axis of the accelerometer of the sensor unit 12. The logic may have additional conditions on signals to improve the performance.

For impact event detection, the MCU 14 calculates an upper impact threshold value and a lower impact threshold value that may be used for all axes of the accelerometer of the sensor unit 12. For example, in the case where the sensor unit 12 includes a 3-axis accelerometer that measures acceleration along the X axis, the Y axis, and the Z axis, the MCU 14 calculates upper and lower impact threshold values that are compared to accelerations along the X axis, the Y axis, and the Z axis. As will be discussed in further detail below, detection of the impact event is performed on all axes of the accelerometer of the sensor unit 12. The logic may have additional conditions on signals to improve the performance.

The method 16 then moves to block 26. In block 26, the MCU 14 saves the threshold values determined in block 24. The threshold values are saved for later use by the sensor unit 12. In one embodiment, the MCU 14 stores the threshold value in a memory shared by the MCU 14 and the sensor unit 12. In one embodiment, the MCU 14 stores the threshold values in the onboard memory (e.g., registers) of the sensor unit 12. In one embodiment, the MCU 14 updates or replaces threshold values currently in the onboard memory of the sensor unit 12 with the threshold values determined in block 24.

As the threshold values are determined by the MCU 14 instead of the sensor unit 12, the threshold values may not be in a suitable format for utilization by the sensor unit 12. In this case, the MCU 14 or the sensor unit 12 converts the threshold values to a format, such as a Float16 format, used by the sensor unit 12 before being saved. The new, converted threshold values are then saved for the sensor unit 12 as discussed above.

The method 16 then moves to block 28. In block 28, the MCU 14 enters a sleep mode. In the sleep mode the MCU 14 is in a low-power or standby state. The power consumption of the MCU 14 in the sleep mode is lower than the power consumption of the MCU 14 during blocks 18 to 26. In one embodiment, the MCU 14 does not process data or execute programs in the sleep mode. In one embodiment, the MCU 14 enters the sleep mode after a threshold amount of time (e.g., 15, 30, or 60 minutes) after block 26 is performed, in case the vehicle is started shortly after entering the off state in block 18. It is noted that the sensor unit 12 remains active, and blocks 32 and 34 are performed while the MCU 14 is in the sleep mode.

The method 16 then moves to block 32. In block 32, the sensor unit 12 obtains the threshold values saved in block 26, monitors for motion events, and determines whether or not a motion event has occurred.

The sensor unit 12 monitors acceleration currently measured by its accelerometer to detect the towing event, jacking event, and impact event. As discussed above, the vehicle is typically lifted to an angle between 6 and 10 degrees during a towing event, lifted to an angle between 1 and 2 degrees during a jacking event, and undergoes a sudden and sharp change in movement during an impact event. Due to the tilt and movement of the vehicle during these events, the sensor unit 12, more specifically the accelerometer of the sensor unit 12, will observe corresponding changes in acceleration during each motion event. As such, the sensor unit 12 is able to detect a towing event, a jacking event, and an impact event based on acceleration measurements. As will be discussed in further detail below, the sensor unit 12 may generate and interrupt and wake up the MCU 14 for further processing of sensor data and response logic.

The sensor unit 12 detects a towing event in a case where the accelerometer of the sensor unit 12, measures acceleration that is greater than the upper towing threshold value determined in block 24 for a threshold amount of time (e.g., 1, 5, or 10 minutes), or that is lower than the lower towing threshold value determined in block 24 for a threshold amount of time. In one embodiment, the sensor unit 12 detects a towing event in a case where a mean or average of acceleration measurements generated by the accelerometer of the sensor unit 12 is greater than the upper towing threshold value determined in block 24 for a threshold amount of time (e.g., 1, 5, or 10 minutes), or is lower than the lower towing threshold value determined in block 24 for a threshold amount of time.

In a case where the sensor unit 12 includes a multi-axis accelerometer, the sensor unit 12 independently performs towing event detection for each axis of the accelerometer of the sensor unit 12. For example, in a case where the sensor unit 12 includes the 3-axis accelerometer that measures acceleration along the X axis, the Y axis, and the Z axis, the sensor unit 12 detects a towing event in a case where acceleration or an average acceleration along the X axis is greater than the X axis upper towing threshold value determined in block 24 for a threshold amount of time, or is lower than the X axis lower towing threshold value determined in block 24 for a threshold amount of time. The sensor unit 12 also detects a towing event in a case where acceleration or an average acceleration along the Y axis is greater than the Y axis upper towing threshold determined in block 24 for a threshold amount of time, or is lower than the Y axis lower towing threshold value determined in block 24 for a threshold amount of time. Further, the sensor unit 12 detects a towing event in a case where acceleration or an average acceleration along the Z axis is greater than the Z axis upper towing threshold value determined in block 24 for a threshold amount of time, or is lower than the Z axis lower towing threshold value determined in block 24 for a threshold amount of time.

Similarly, the sensor unit 12 detects a jacking event in a case where the accelerometer of the sensor unit 12, measures acceleration that is greater than the upper jacking threshold value determined in block 24 for a threshold amount of time (e.g., 1, 5, or 10 minutes), or that is lower than the lower jacking threshold value determined in block 24 for a threshold amount of time. In one embodiment, the sensor unit 12 detects a jacking event in a case where a mean or average of acceleration measurements generated by the accelerometer of the sensor unit 12 is greater than the upper jacking threshold value determined in block 24 for a threshold amount of time (e.g., 1, 5, or 10 minutes), or is lower than the lower jacking threshold value determined in block 24 for a threshold amount of time.

In a case where the sensor unit 12 includes a multi-axis accelerometer, the sensor unit 12 independently performs jacking event detection for each axis of the accelerometer of the sensor unit 12. For example, in a case where the sensor unit 12 includes the 3-axis accelerometer that measures acceleration along the X axis, the Y axis, and the Z axis, the sensor unit 12 detects a jacking event in a case where acceleration or an average acceleration along the X axis is greater than the X axis upper jacking threshold determined in block 24 for a threshold amount of time, or is lower than the X axis lower jacking threshold value determined in block 24 for a threshold amount of time. The sensor unit 12 also detects a jacking event in a case where acceleration or an average acceleration along the Y axis is greater than the Y axis upper jacking threshold determined in block 24 for a threshold amount of time, or is lower than the Y axis lower jacking threshold value determined in block 24 for a threshold amount of time. Further, the sensor unit 12 also detects a jacking event in a case where acceleration or an average acceleration along the Z axis is greater than the Z axis upper jacking threshold determined in block 24 for a threshold amount of time, or is lower than the Z axis lower jacking threshold value determined in block 24 for a threshold amount of time.

Figure 3:
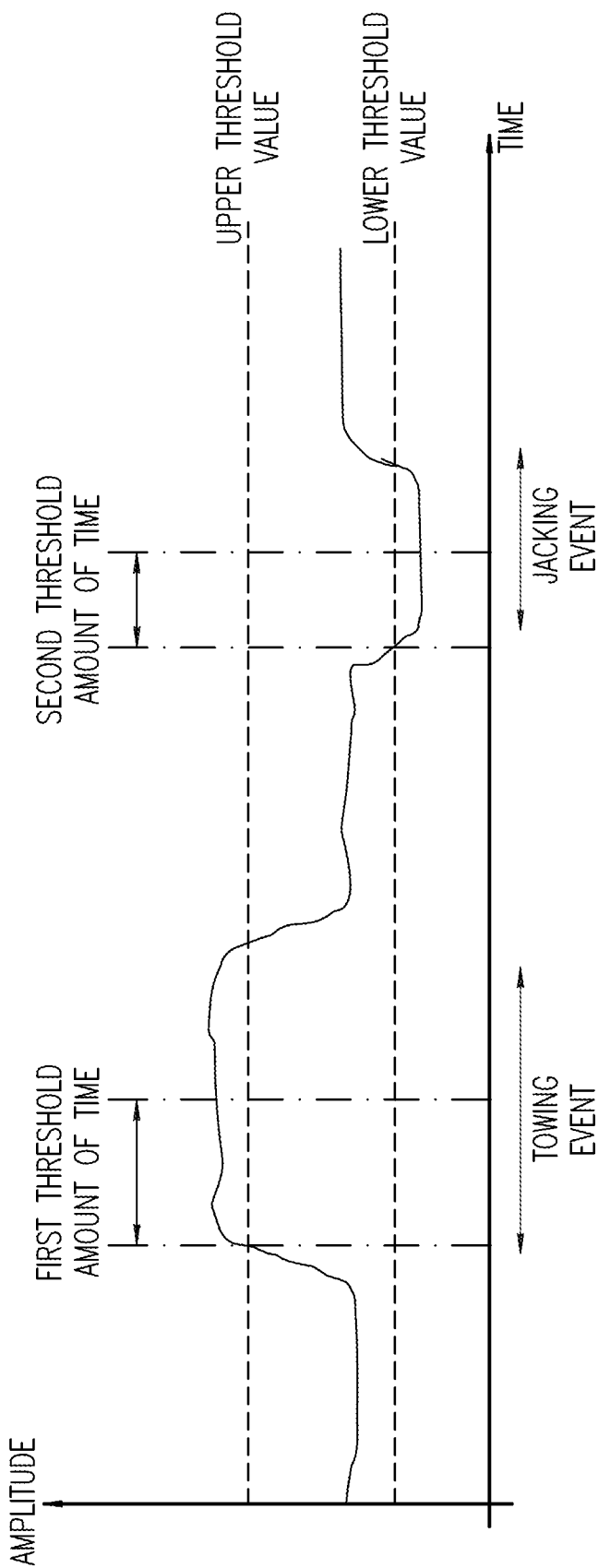
FIG. 3 shows a mean acceleration signal according to an embodiment disclosed herein.

As an example, FIG. 3 shows an acceleration signal according to an embodiment disclosed herein. In FIG. 3, the vertical axis is an amplitude axis, and the horizontal axis is a time axis. The same upper and lower thresholds are used to detect a towing event and a jacking event.

In the example shown in FIG. 3, a towing event is detected in response to the acceleration signal being greater than the upper threshold value for a first threshold amount of time. In addition, a jacking event is detected in response to the acceleration signal being less than the lower threshold value for a second threshold amount of time.

Figure 4:
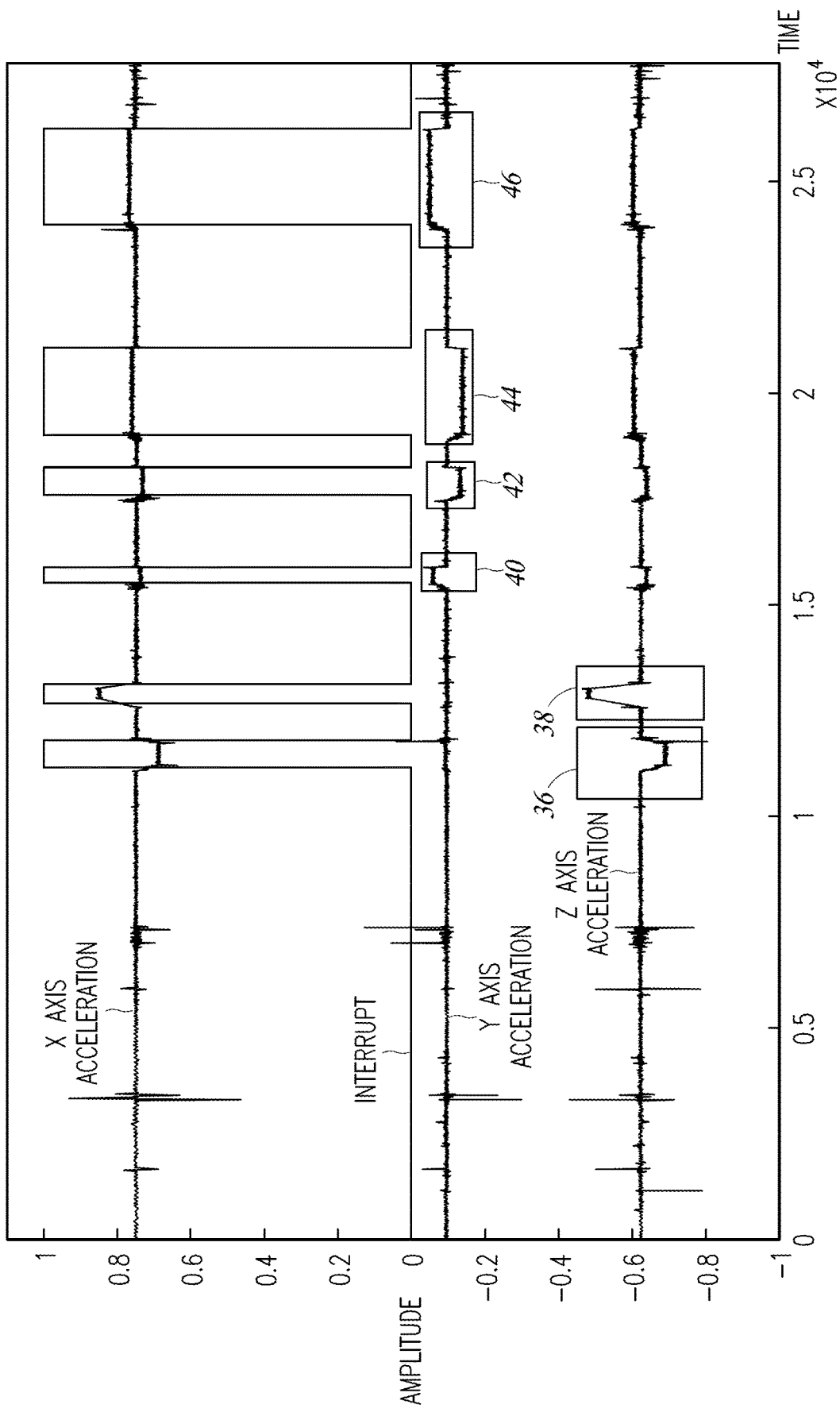
FIG. 4 shows acceleration signals along an X axis, a Y axis, and a Z axis; and an interrupt signal according to an embodiment disclosed herein.

As another example, FIG. 4 shows acceleration signals along an X axis, a Y axis, and a Z axis; and an interrupt signal according to an embodiment disclosed herein. In FIG. 4, the vertical axis is an amplitude axis, and the horizontal axis is a time axis.

In the example shown in FIG. 4, the vehicle is towed and jacked (i.e., lifted) by different wheels of the vehicle.

In block 36, the vehicle is towed by the vehicle's front wheels, which results in a decrease in the Z axis acceleration signal. In block 38, the vehicle is towed by the vehicle's rear wheels in block 38, which results in an increase in the Z axis acceleration signal due to observation of gravity. Consequently, towing events are detected in blocks 36 and 38.

In block 40, the vehicle's front left wheel is jacked, which results in an increase in the Y axis acceleration signal. In block 42, the vehicle's front right wheel is jacked, which results in a decrease in the Y axis acceleration signal. In block 42, the vehicle's rear left wheel is jacked, which results in a decrease in the Y axis acceleration signal. In block 46, the vehicle's rear right wheel is jacked, which results in an increase in the Y axis acceleration signal. Consequently, jacking events are detected in blocks 40, 42, 44, and 46.

The sensor unit 12 transmits an interrupt to the MCU 14 in order to wake the MCU 14. As such, the interrupt signal is set to a high state in response to detecting each of the towing events in blocks 36 and 38 and each of the jacking events in blocks 40, 42, 44, and 46.

Returning to FIG. 2, the sensor unit 12 detects an impact event in a case where the accelerometer of the sensor unit 12, measures (1) acceleration that is greater than the upper impact threshold value determined in block 24, and (2) an acceleration that is lower than the lower impact threshold value determined in block 24, within a threshold amount of time (e.g., 1, 3, or 5 seconds).

In a case where the sensor unit 12 includes a multi-axis accelerometer, the sensor unit 12 performs impact event detection based on accelerations along all of the axes of the accelerometer. For example, in a case where the sensor unit 12 includes the 3-axis accelerometer that measures acceleration along the X axis, the Y axis, and the Z axis, the sensor unit 12 detects an impact event in a case where (1) a first acceleration along the X axis, a second acceleration along the Y axis, and a third acceleration along the Z axis are greater than the upper impact threshold value determined in block 24, and (2) fourth acceleration along the X axis, a fifth acceleration along the Y axis, and sixth acceleration along the Z axis are lower than the lower impact threshold value determined in block 24, within a threshold amount of time.

Figure 5:
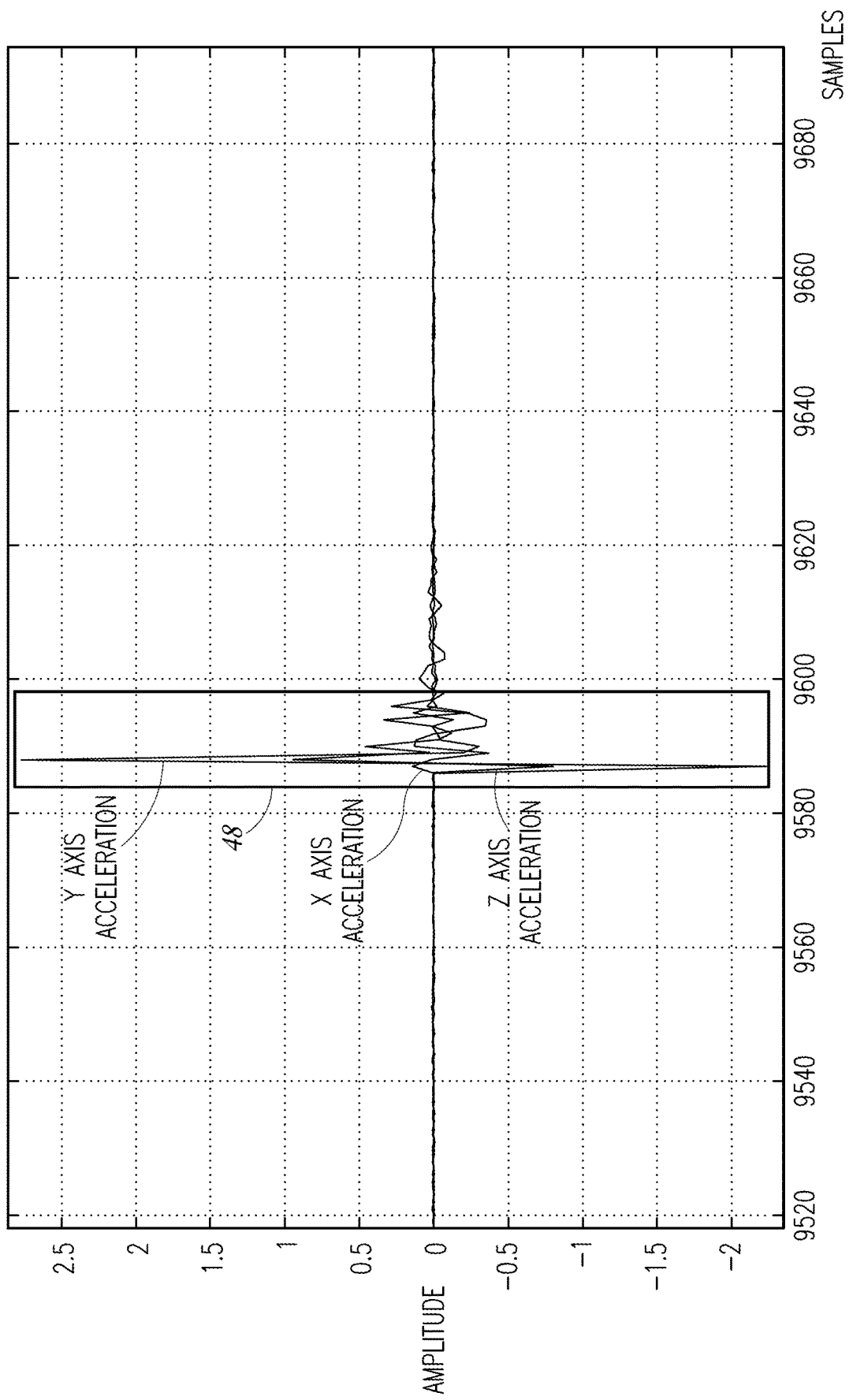
FIG. 5 shows high pass filtered acceleration signals along an X axis, a Y axis, and a Z axis according to an embodiment disclosed herein.

As an example, FIG. 5 shows high pass filtered acceleration signals along an X axis, a Y axis, and a Z axis according to an embodiment disclosed herein. In FIG. 5, the vertical axis is an amplitude axis, and the horizontal axis is a sample axis. The amplitude of signals can vary based on intensity of impact, and logic can be configured to detect different intensity level of events.

In the example shown in FIG. 5, the vehicle undergoes an impact from another object, such as another vehicle, in block 48. As a result, the X axis acceleration signal, the Y axis acceleration signal, and the Z axis acceleration signal fluctuate greatly to large positive and negative values within short duration. Consequently, an impact event is detected in block 48.

In one embodiment, the threshold amount of times utilized in block 32 are also determined by the MCU 14 in block 24 along with the threshold values. In another embodiment, the threshold amount of times utilized in block 32 are set in the sensor unit 12 prior to executing block 32 (e.g., during initial configuration or installation of the device 10).

In one embodiment, in response to detecting a motion event (e.g., the towing event, the jacking event, or the impact event), the sensor unit 12 disables motion event detection for a fixed duration of time (e.g., 5, 10, or 15 minutes) to avoid multiple detections of the same event.

In a case where a motion event is not detected in block 32, the method 16 remains on block 32 where the sensor unit 12 continues to monitor for motion events.

In a case where a motion event is detected in block 32, the method 16 moves to block 34. In block 34, the sensor unit 12 wakes the MCU 14 to exit the sleep mode and notifies the MCU 14 of the occurrence and the type (e.g., a towing event, a jacking event, or an impact event) of the motion event. For example, the sensor unit 12 transmits an interrupt to the MCU 14 in response to detecting a towing event, a jacking event, or an impact event.

In response to being awoken and notified of the detected motion event, the MCU 14 triggers other services of the device 10. In one embodiment, the MCU 14 triggers or initiates one or more of a transmission of a notification indicating the motion event to a user, an alarm, and a message to emergency services.

Upon completion of block 34, the method 16 returns to block 18 to monitor for the vehicle entering to the off state again.

As discussed above, blocks 32 and 34 are performed by the sensor unit 12. The sensor unit 12 executes, for example, a finites state machine or a decision tree logic with its onboard processor to perform blocks 32 and 34.

As the MCU 14 enters the sleep mode (block 28) and motion event detection (blocks 32 and 34) is handled by the power-efficient, low-powered sensor unit 12, the motion event detection consumes very little power (e.g., 5 and 10 microamps). As a result, the motion event detection disclosed herein is well suited for execution while the vehicle is parked and turned off. In addition, the motion event detection is able to obtain accurate results regardless of the orientation of the vehicle (e.g., parked on a flat surface or on a hill) because the MCU 14 recalculates the gravity vector (block 22) and the threshold values (block 24) each time the vehicle is parked. As such, the motion event detection is not constrained by the installation position of the device 10 in the vehicle.

Although the embodiments described above are with respect to motion event detection for a vehicle, the embodiments may also be applied to asset tracking. For example, the device 10 may be mounted on an object, and the method 16 may be used to perform impact detection for the object. In this case, block 18 is removed from the method 16; and the MCU 14 determines whether the object is in a stable state in block 20, determines a gravity vector of the object in block 22, determines threshold values for an impact event in block 26, and monitors for impact detection in block 32.

The various embodiments disclosed herein provide a device and method for detection of motion events including towing of the vehicle, jacking of the vehicle, and the vehicle being hit by another object. Processing is split between an MCU and a sensor unit. After the vehicle is turned off and before the MCU enters a sleep mode, the MCU calculates a gravity vector of the vehicle using accelerometer data, calculates threshold values based on the gravity vector, and saves the threshold values. After the MCU enters the sleep mode, the sensor unit subsequently monitors and detects motion events with the saved threshold values.

According to one embodiment, a device may be summarized as including a main control unit configured to determine that a vehicle is in an off state, determine that the vehicle is in a stable state, determine a gravity vector in response to the vehicle being in the off state and the stable state determine a plurality of threshold values based on the gravity vector, save the plurality of threshold values in a memory, and enter a sleep mode in response to the plurality of threshold values being saved in the memory; and a sensor unit including an accelerometer, the sensor unit is configured to obtain the plurality of threshold values from the memory; generate, by the accelerometer, a plurality of acceleration measurements; and detect a motion event based on the plurality of threshold values and the plurality of acceleration measurements.

The sensor unit may include the memory.

The main control unit may be in a low-power state in the sleep mode.

The accelerometer may be configured to measure acceleration along three axes, and the plurality of threshold values may include first and second threshold values for each of the three axes.

The sensor unit may be configured to notify the main control unit of the motion event in response to the motion event being detected, and the main control unit may exit the sleep mode in response to being notified of the motion event.

The main control unit may be configured to initiate transmission of a notification to a user in response to being notified of the motion event.

The vehicle's engine may be off in the off state.

The main control unit may be configured to determine the vehicle is in the stable state based on a mean and a variance of acceleration measured by the accelerometer.

The motion event may be an event selected from a towing event in which the vehicle is towed by another vehicle, a jacking event in which one or more tires of the vehicle is lifted, and an impact event in which the vehicle is hit by another object.

A method may be summarized as including determining, by a main control unit, a vehicle is in an off state and a stable state; determining, by the main control unit, a gravity vector in response to determining the vehicle is in the off state and the stable state; determining, by the main control unit, a plurality of threshold values based on the gravity vector; saving, by the main control unit, the plurality of threshold values in a memory; entering, by the main control unit, a sleep mode in response to saving the plurality of threshold values in the memory; obtaining, by a sensor unit, the plurality of threshold values; measuring, by the sensor unit, acceleration; and detecting, by the sensor unit, a motion event based on the plurality of threshold values and the acceleration.

The method may further include notifying, by the sensor unit, the main control unit of the motion event in response to detecting the motion event; and exiting, by the main control unit, the sleep mode in response to being notified of the motion event.

The motion event may be an event selected from a towing event in which the vehicle is towed by another vehicle, a jacking event in which one or more tires of the vehicle is lifted, and an impact event in which the vehicle is hit by another object.

The detecting of the motion event may include determining the acceleration is greater than a first threshold value of the plurality of threshold values for a first determined amount of time, or less than a second threshold value of the plurality of threshold values for a second determined amount of time.

The measuring of the acceleration may include measuring acceleration along a plurality of axes, and the detecting of the motion event may include determining acceleration along one of the plurality of axes is greater than a first threshold value of the plurality of threshold values for a first determined amount of time, or less than a second threshold value of the plurality of threshold values for a second determined amount of time.

The motion event may be a towing event in which the vehicle is towed by another vehicle, or a jacking event in which one or more tires of the vehicle is lifted.

The measuring of the acceleration may include measuring acceleration along a plurality of axes, and the detecting of the motion event may include determining acceleration along each of the plurality of axes is greater than a first threshold value of the plurality of threshold values for a first determined amount of time, and less than a second threshold value of the plurality of threshold values for a second determined amount of time.

The motion event may be an impact event in which the vehicle is hit by another object.

A device may be summarized as including a sensor unit configured to generate first acceleration measurements along a plurality of axes; a main control unit configured to determine a gravity vector based on the first acceleration measurements; determine, based on the gravity vector, first and second threshold values for each of the plurality of axes; save, in a memory, the first and second threshold values for each of the plurality of axes; and enter, in response to the first and second threshold values for each of the plurality of axes being saved in the memory, a sleep mode, wherein the sensor unit is further configured to obtain, from the memory, the first and second threshold values for each of the plurality of axes; generate second acceleration measurements along the plurality of axes; and detect a motion event based on the first and second threshold values for each of the plurality of axes and the second acceleration measurements.

The main control unit may be configured to determine that a vehicle is in an off state and a stable state, the gravity vector being determined in response to the vehicle being in the off state and the stable state.

The sensor unit may be configured to detect the motion event in response to measurements of the second acceleration measurements, which are along a first axis of the plurality of axes, being greater than the first threshold value for the first axis, or less than the second threshold value for the first axis.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device, comprising:
a main control unit configured to:
determine that a vehicle is in an off state;
determine that the vehicle is in a stable state;
determine a gravity vector in response to the vehicle being in the off state and the stable state;
determine a plurality of threshold values based on the gravity vector, the plurality of threshold values including at least two threshold values for each of a plurality of motion events;
save the plurality of threshold values in a memory; and
enter a sleep mode in response to the plurality of threshold values being saved in the memory; and
a sensor unit including an accelerometer, the sensor unit is configured to:
obtain, while the main control unit is in the sleep mode, the plurality of threshold values saved by the main control unit from the memory;
generate, by the accelerometer, a plurality of acceleration measurements; and
detect the plurality of motion events based on the plurality of threshold values and the plurality of acceleration measurements.

2. The device of claim 1 wherein the sensor unit includes the memory.

3. The device of claim 1 wherein the main control unit is in a low-power state in the sleep mode.

4. The device of claim 1 wherein the accelerometer is configured to measure acceleration along three axes, and the plurality of threshold values includes first and second threshold values for each of the three axes.

5. The device of claim 1 wherein
the sensor unit is configured to notify the main control unit of a motion event of the plurality of motion events being detected, and
the main control unit exits the sleep mode in response to being notified of the motion event being detected.

6. The device of claim 5 wherein the main control unit is configured to initiate transmission of a notification to a user in response to being notified of the motion event being detected.

7. The device of claim 1 wherein the vehicle's engine is off in the off state.

8. The device of claim 1 wherein the main control unit is configured to determine the vehicle is in the stable state based on a mean and a variance of acceleration measured by the accelerometer.

9. The device of claim 1 wherein the plurality of motion events includes an event selected from a towing event in which the vehicle is towed by another vehicle, a jacking event in which one or more tires of the vehicle is lifted, and an impact event in which the vehicle is hit by another object.

10. The device of claim 1 wherein each of the at least two threshold values is determined based on the gravity vector and an adjustment value.

11. A method, comprising:
determining, by a main control unit, a vehicle is in an off state and a stable state;
determining, by the main control unit, a gravity vector in response to determining the vehicle is in the off state and the stable state;
determining, by the main control unit, a plurality of threshold values based on the gravity vector;
saving, by the main control unit, the plurality of threshold values in a memory;
entering, by the main control unit, a sleep mode in response to saving the plurality of threshold values in the memory;
obtaining, by a sensor unit, the plurality of threshold values;
measuring, by the sensor unit, acceleration along a plurality of axes; and
detecting, by the sensor unit, one or more motion events based on the plurality of threshold values and the acceleration along the plurality of axes,
the detecting of the one or more motion events includes detecting a first motion event in response to determining acceleration along each of the plurality of axes is greater than a first threshold value of the plurality of threshold values for a first determined amount of time, and less than a second threshold value of the plurality of threshold values for a second determined amount of time.

12. The method of claim 11, further comprising:
notifying, by the sensor unit, the main control unit of the one or more motion events in response to detecting the one or more motion events; and
exiting, by the main control unit, the sleep mode in response to being notified of the one or more motion events.

13. The method of claim 11 wherein the one or more motion events includes an event selected from a towing event in which the vehicle is towed by another vehicle, a jacking event in which one or more tires of the vehicle is lifted, and an impact event in which the vehicle is hit by another object.

14. The method of claim 11 wherein
the detecting of the one or more motion events includes detecting a second motion event in response to determining acceleration along one of the plurality of axes is greater than a third threshold value of the plurality of threshold values for a third determined amount of time, or less than a fourth threshold value of the plurality of threshold values for a fourth determined amount of time.

15. The method of claim 14 wherein the second motion event is a towing event in which the vehicle is towed by another vehicle, or a jacking event in which one or more tires of the vehicle is lifted.

16. The method of claim 11 wherein the first motion event is an impact event in which the vehicle is hit by another object.

17. A device, comprising:
a sensor unit configured to generate first acceleration measurements along a plurality of axes;
a main control unit configured to:
  determine a gravity vector based on the first acceleration measurements;
  determine, based on the gravity vector, first and second threshold values for each of a plurality of motion events;
  save, in a memory, the first and second threshold values for each of the plurality of motion events; and
  enter, in response to the first and second threshold values for each of the plurality of motion events being saved in the memory, a sleep mode, wherein the sensor unit is further configured to:
  obtain, from the memory and in response to the main control unit entering the sleep mode, the first and second threshold values for each of the plurality of motion events that were saved by the main control unit;
  generate second acceleration measurements along the plurality of axes; and
  detect the plurality of motion events based on the first and second threshold values for each of the plurality of motion events and the second acceleration measurements.

18. The device of claim 17 wherein the main control unit is configured to:
determine that an object is in a stable state, the gravity vector being determined in response to the object being in the stable state.

19. The device of claim 17 wherein the sensor unit is configured to detect a motion event of the plurality of motion events in response to measurements of the second acceleration measurements, which are along a first axis of the plurality of axes, being greater than the first threshold value for the first axis, or less than the second threshold value for the first axis.

20. The device of claim 17 wherein the main control unit is configured to:
set the gravity vector to a previously determined gravity vector.

* * * * *